United States Patent
Chang

(10) Patent No.: US 6,776,565 B2
(45) Date of Patent: Aug. 17, 2004

(54) STRUCTURE OF AN ANTI-BURGLAR SCREW BOLT

(75) Inventor: Shih-I Chang, Tainan (TW)

(73) Assignee: Flamante Industry Ltd., Tainan (TW)

( * ) Notice: Subject to any disclaimer, the term of this patent is extended or adjusted under 35 U.S.C. 154(b) by 0 days.

(21) Appl. No.: 10/236,706

(22) Filed: Sep. 10, 2002

(65) Prior Publication Data

US 2004/0047706 A1 Mar. 11, 2004

(51) Int. Cl.$^7$ ............................................. F16B 39/24
(52) U.S. Cl. ...................... 411/136; 411/149; 411/161; 411/405
(58) Field of Search .................................. 411/136, 149, 411/150, 161, 162, 405, 533, 144

(56) References Cited

U.S. PATENT DOCUMENTS

| | | | | |
|---|---|---|---|---|
| 3,417,802 A | * | 12/1968 | Oldenkott | 411/144 X |
| 3,895,663 A | * | 7/1975 | BashLine et al. | 411/136 |
| 5,080,545 A | * | 1/1992 | McKinlay | 411/136 X |
| 5,090,855 A | * | 2/1992 | Terry | 411/149 X |
| 5,626,449 A | * | 5/1997 | McKinlay | 411/533 X |
| 6,039,524 A | * | 3/2000 | McKinlay | 411/136 X |

* cited by examiner

Primary Examiner—Neill Wilson
(74) Attorney, Agent, or Firm—Leong C. Lei

(57) ABSTRACT

An improved structure of an anti-burglar screw bolt having a pad and a nut, the bolt including a bolt head and a bolt shaft, characterized in that the bolt head is hexagonal with the inner edges being arranged with equal angle and provided with sloping faces continuing from one to another, and connection region of each of the sloping faces being a blocking face having a high-low depression, the pad being flat and circular having a diameter equivalent to the largest diameter of the bolt head, the center of the pad being provided with a through hole having a hole diameter larger than that of the bolt shaft, one face of the pad being formed into a continuing sloping face corresponding to the sloping face of the individual bolt head, the other face of the pad being provided with a plurality of equally arranged sharp engaging straps, each of the strap having an upright face and a sloping face, the sloping direction of the sloping face being similar to that of the continuing sloping face of the pad, the nut being hexagonal, the inner edge of each side thereof being provided with a sloping face corresponding to the continuing sloping face, and the connection region of each sloping face being also formed into a blocking face having a high-low depression.

1 Claim, 6 Drawing Sheets

US 6,776,565 B2

STRUCTURE OF AN ANTI-BURGLAR SCREW BOLT

BACKGROUND OF THE INVENTION (a) Technical Field of the Invention

The present invention relates to a screw bolt, and in particular, to a screw bolt which has specific sloping face to prevent unloading without using a specific tool.

(b) Description of the Prior Art

FIG. 1 shows a conventional screw nut and bolt used for locking. As illustrated, a packing ring 11 is first placed on a working piece 6 and then a bolt 1 is inserted through the packing ring 11 and the working piece to engage with two lock nuts 12 and 13. However, the lock nuts 12 and 13 will become loose if subject to vibration for a long period time. Hence, another method as shown in FIG. 2 is proposed to obviate this drawback. The screw nut 2 is provided with a through hole 21 for an iron wire 22 to pass through. The other end of the wire 22 is mounted onto other work piece. The iron wire prevents the nut 2 from dislocation. However, this conventional structure can be easily unloaded by cutting off the iron wire 22. Therefore, this conventional screw bolt/nut cannot prevent a locked object from burglary.

SUMMARY OF THE INVENTION

Accordingly, it is an aspect of the present invention to provide an improved structure of an anti-burglar screw bolt having a pad and a nut, the bolt including a bolt head and a bolt shaft, characterized in that the bolt head is hexagonal with the inner edges being arranged with equal angle and provided with sloping faces continuing from one to another such that the shallowest region of a fore notch of the sloping face is the deepest region of a subsequent notch of the sloping face, and connection region of each of the sloping face being a blocking face having a high-low depression; the pad is flat and circular having a diameter equivalent to the largest diameter of the bolt head, the center of the pad is provided with a through hole having a hole diameter larger than that of the bolt shaft, one face of the pad is formed into a continuing sloping face corresponding to the sloping face of the individual bolt head such that the thinnest region of the fore sloping face is the thickest region of the subsequent sloping face and the individual connecting region is formed into a holding face having a high-low depression, and the other face of the pad is provided with a plurality of equally arranged sharp engaging straps, each of the strap has an upright face and a sloping face and the sloping direction of the sloping face is similar to that of the continuing sloping face of the pad; and the nut is hexagonal and the inner edge of each side thereof is provided with a sloping face corresponding to the continuing sloping face, the connection region of each sloping face is also formed into a blocking face having a high-low depression.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 2:
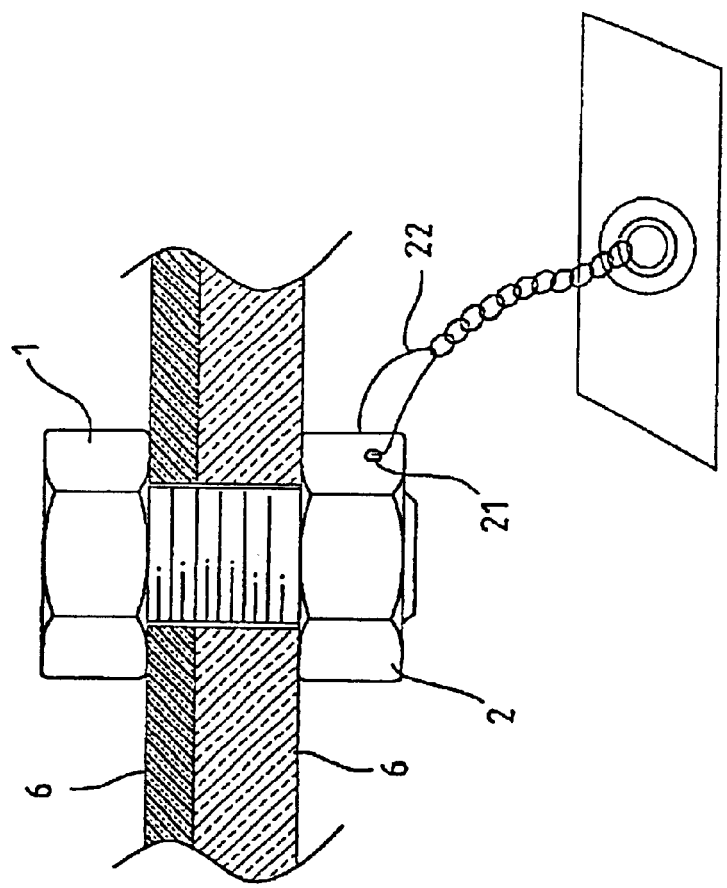
FIG. 2 is a schematic view showing another conventional screw bolt.
Figure 1:
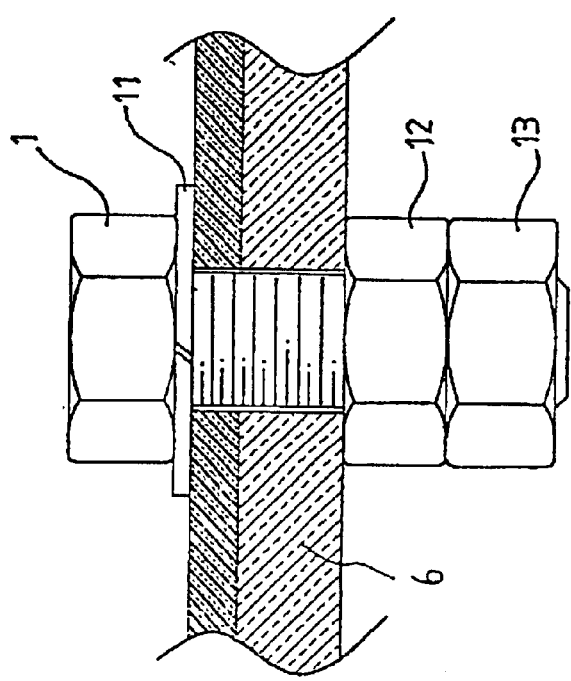
FIG. 1 is a schematic view showing a conventional screw bolt.
Figure 3:
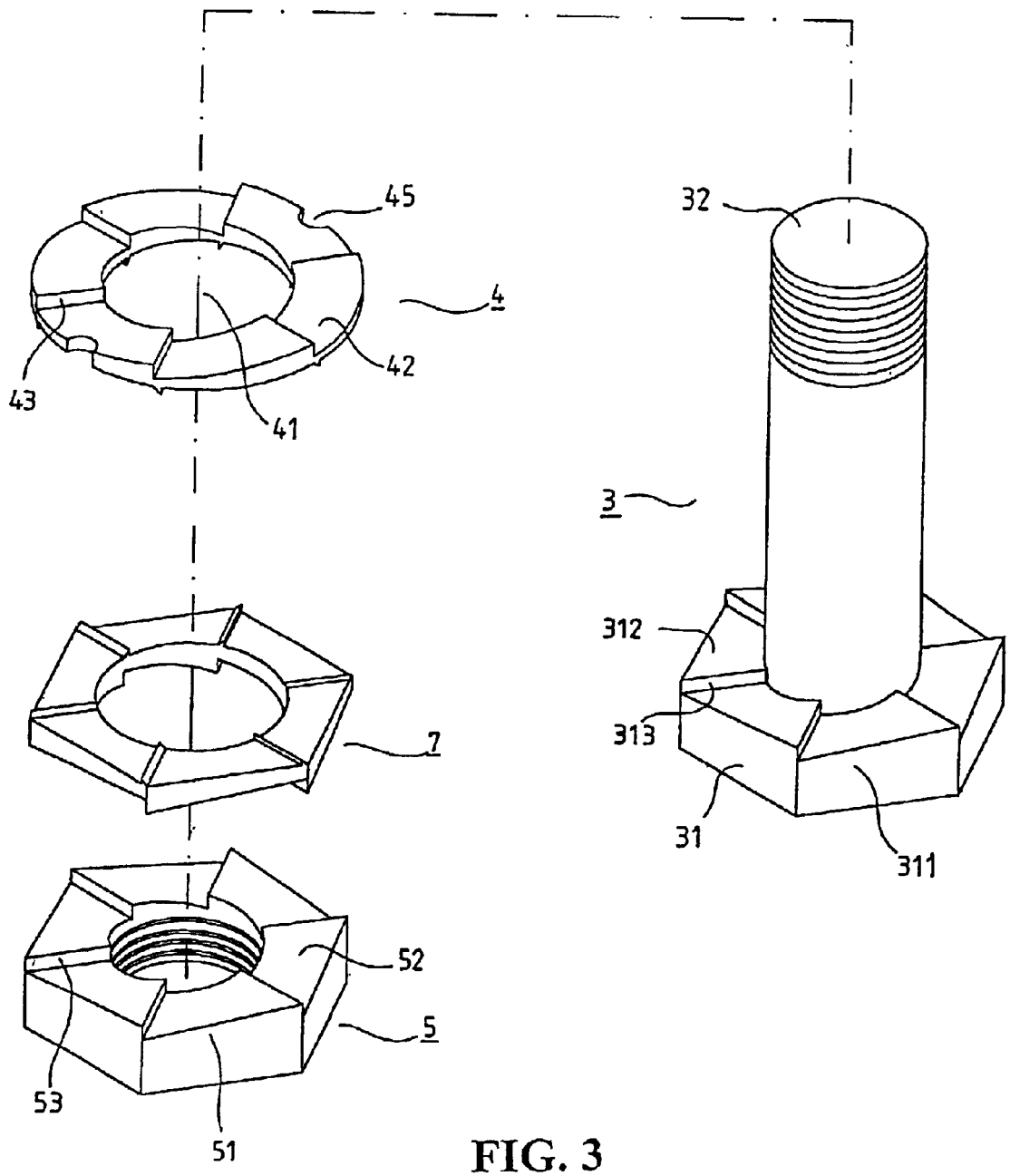
FIG. 3 is a perspective exploded view in accordance with the present invention.
Figure 6:
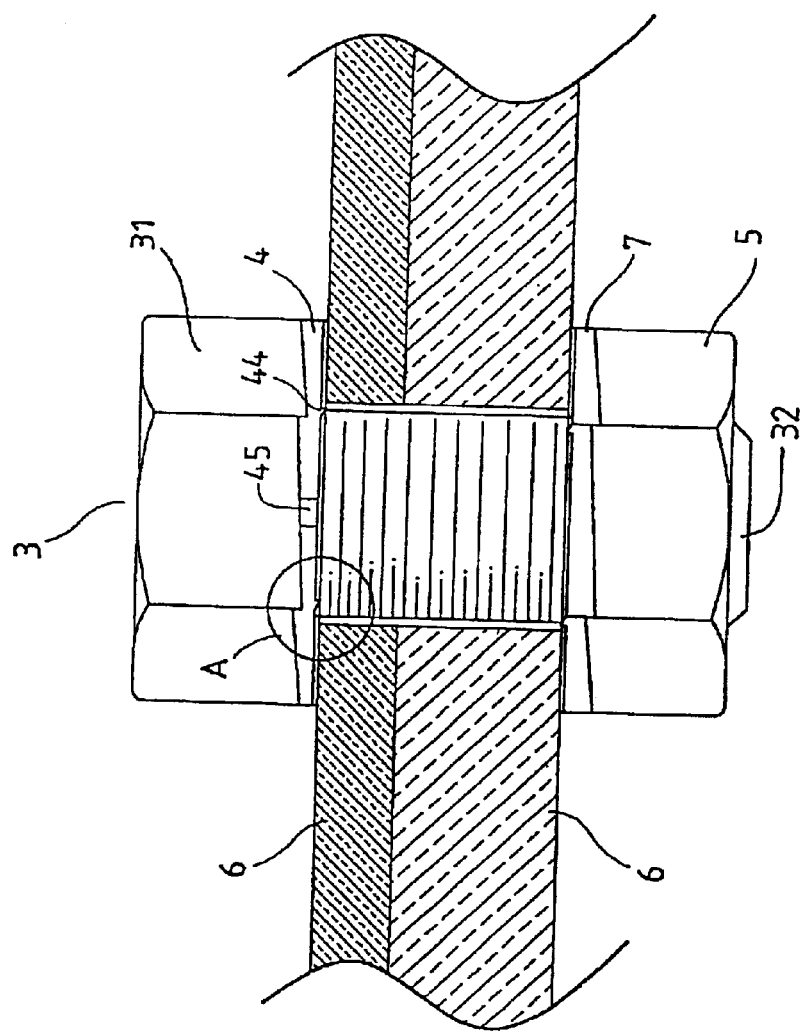
FIG. 6 is a sectional view of the present invention.
Figure 6A:
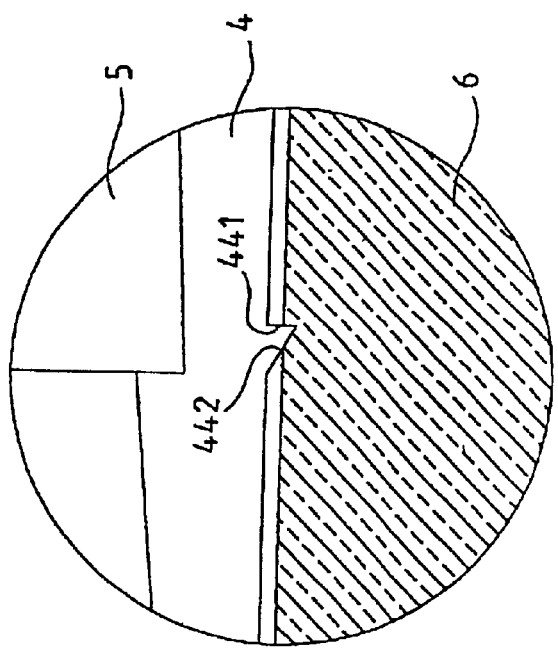
FIG. 6A is an enlarged view of a portion of FIG. 6.

Referring to FIGS. 3, 6 and 6A, there is shown an improved structure of an anti-burglar screw bolt 3 having a washer 4 and a nut 5, the bolt 3 including a bolt head 31 and a bolt shaft 32, characterized in that the bolt head 31 is hexagonal and has inner edges 311 being arranged with an equal angle. The bolt head 31 and the nut 5 are provided with a plurality of sloping faces 312 such that the shallowest region of a fore notch of the sloping face 312 is the deepest region of a subsequent notch of the sloping face 312, and the connection region of each of the sloping faces 312 being a blocking face 313. The washer 4 is flat and circular having a diameter equivalent to the largest diameter of the bolt head 31, and the center of the washer 4 is provided with a through hole 41 having a hole diameter larger than that of the bolt shaft 32. One face of the washer 4 is formed into a plurality of sloping faces 42 corresponding to the sloping faces 312 of the individual bolt head 31 such that the thinnest region of the fore sloping face 42 is the thickest region of the subsequent sloping face 42 and the individual connecting region is formed into a blocking face. The other face of the washer 4 is provided with a plurality of equally arranged sharp engaging ribs 44. Each of the ribs 44 has an upright face and a sloping face and the sloping direction of the sloping face is similar to that of the sloping face 42 of the washer 4, and the nut 5 is hexagonal and the inner edge of each side thereof is provided with a sloping face 52 corresponding to the sloping face 42 of the washer 4, the connection region of each sloping face 52 is also formed with a blocking face 53. The opposite sides of the washer 4 are each formed with a notch 45.

To implement the structure as disclosed above, as shown in FIGS. 6 and 6A, the bolt shaft 32 of the screw bolt 3 passes through the washer 4 and two working pieces 6 in sequence, and in turn, another washer 7 being placed in a reverse position is passed through, and a screw nut 5 is used to secure the two working pieces 6. The locking face 313 of the bolt head 31 and the blocking faces 53 of the nut 5 will urge the blocking face 43 of the washers 4, 7 to drive the washers 4, 7 in rotation.

Figure 5:
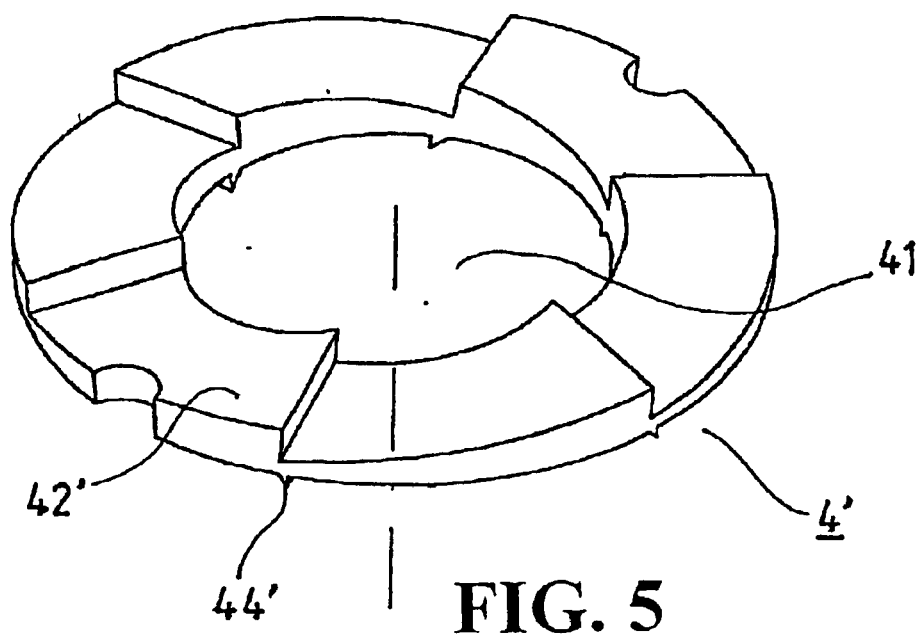
FIG. 5 is another preferred embodiment of a pad in accordance with the present invention.
Figure 5A:
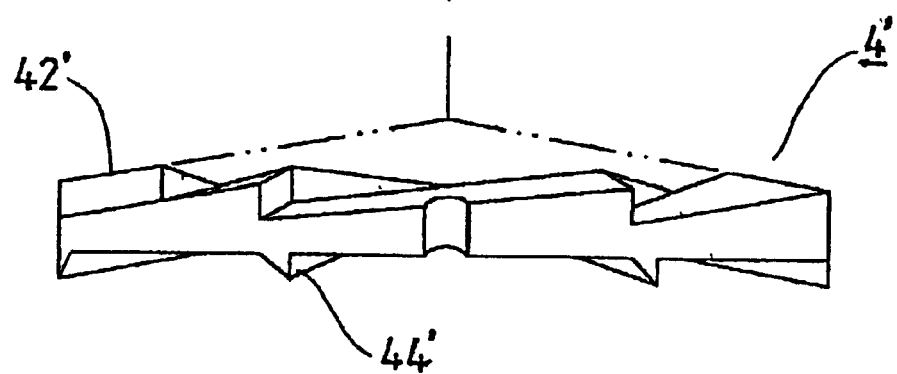
FIG. 5A is a side view of FIG. 5.

FIGS. 5 and 5A illustrate another preferred embodiment of the washer in accordance with the present invention. As shown, the inner edge of the through hole 41 is raised thereby making the sloping face 42' extend and the sharp engaging rib 44' against the center.

Figure 4:
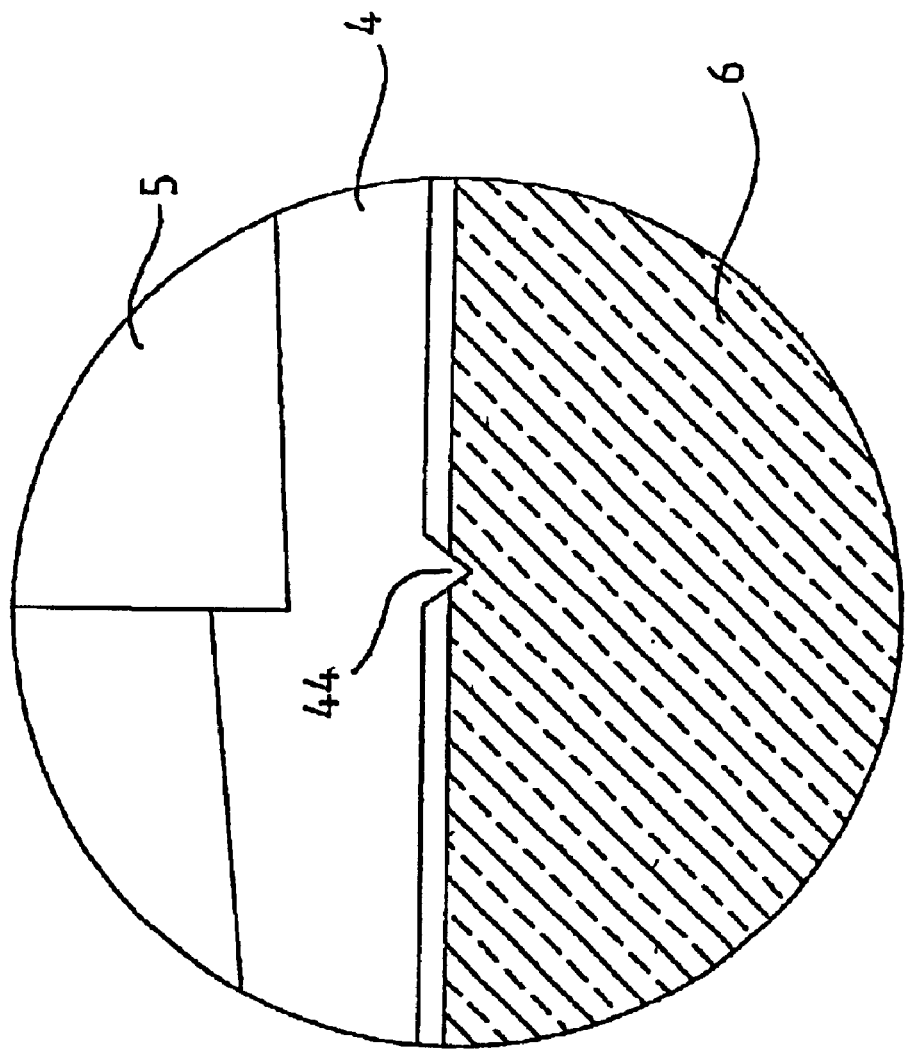
FIG. 4 is a preferred embodiment of a sharp engaging strap in accordance with the present invention.

The pads washers 4, 7 follow the direction of the sloping face 442 of the engaging rib 44 and therefore the working piece 6 is tightened gradually such that the sharp engaging rib 44 is forced to engage with the surface of the working piece 6 (see FIGS. 3 and 4).

If the bolt head 31 or the nut 5 is to rotate in reverse direction, due to the resisting of the sloping face 42 and the sloping face 312, together the resisting of the upright face 441 of the sharp engaging rib 431 with the working piece 6, the screw bolt 3 will not be dislocated.

Figure 7:
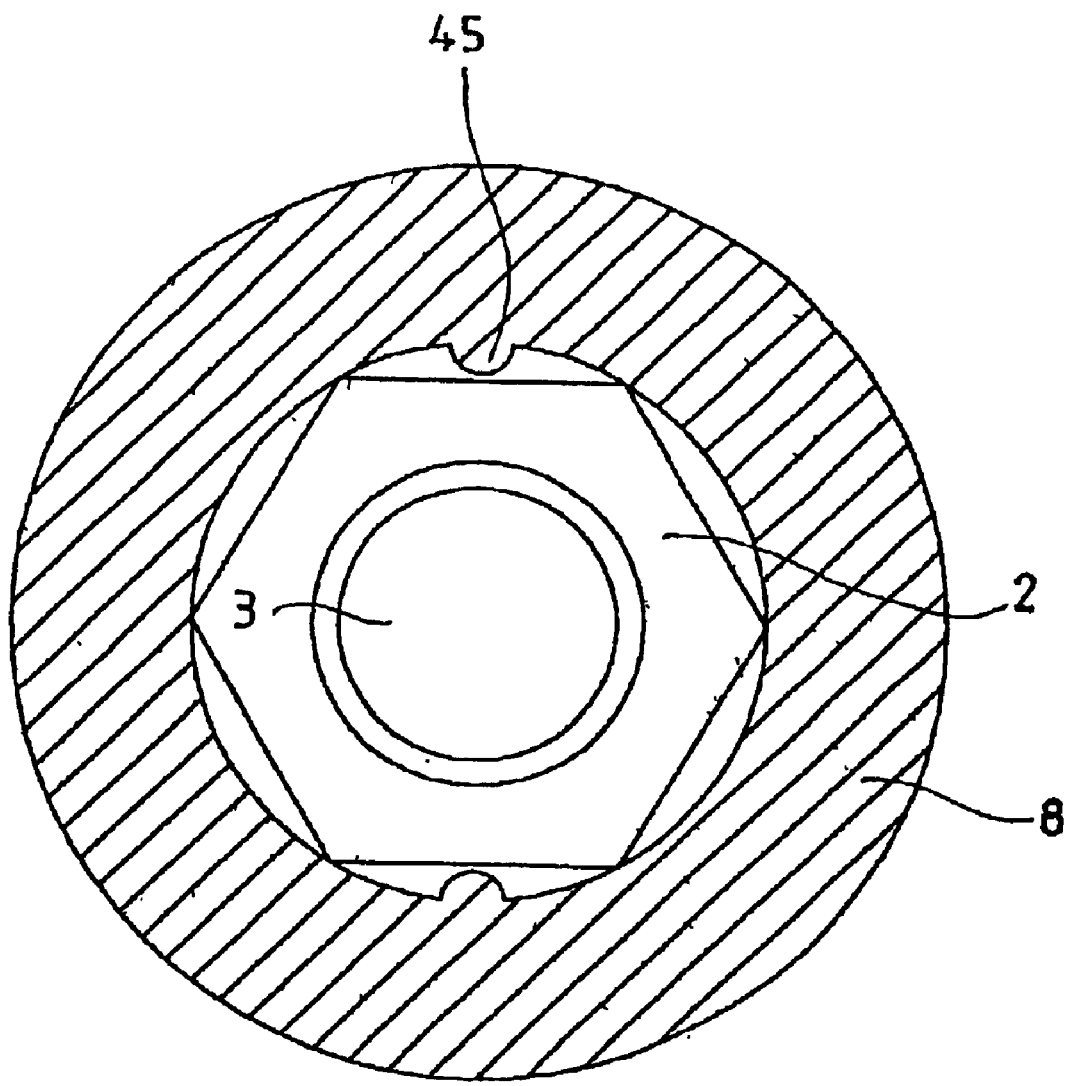
FIG. 7 illustrates the unloading of the screw bolt of the present invention using a specific tool.

If the screw bolt 3 is to be unloaded, a specific tool 8 has to be used to simultaneously unload the washer 7 with the screw nut or bolt head. If the washer 4 is in a circular shape, a common tool cannot grip the washer together with the nut or the bolt head and therefore, the screw bolt 3 prevents the bolt from being unloaded. Thus, only a specific tool 8 has to be used to mount with the notch 45 of the pad washer 4 (as shown in FIG. 7) in order to unload the washer 4 together with the nut or the bolt head. The tool 8 has inner axially extending protrusions that engage the notches in the washer and at the same time engage the wrenching flats 311 on the bolt head (which will hold or turn both the bolt head and the washer at the same time). The tool 8 cannot be inserted over both the bolt head (or nut) and the underlying washer unless the washer notches are aligned with the centers of opposed flats on the bolt head or nut. If the washer has rotated relative to the bolt head so that the notches are not aligned with the centers of the flats on the head then the tool will be blocked from moving down into engagement with the notches.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A structure of an anti-burglar screw bolt having a washer and a nut, said bolt including a bolt head and a bolt shaft, wherein said bolt head is hexagonal and has inner edges being arranged with an equal angle, said bolt head and said nut are provided with a plurality of first sloping faces such that shallowest region of a fore notch of said first sloping faces is deepest region of a subsequent notch of said first sloping faces, connection region of each of said first sloping faces being a blocking face, said washer is flat and circular having a diameter equivalent to largest diameter of said bolt head, and a center of said washer is provided with a through hole having a hole diameter larger than diameter of said bolt shaft, one face of said washer is formed into a plurality of second sloping faces corresponding to said first sloping faces of said bolt head such that thinnest region of a fore one of said second sloping faces is thickest region of a subsequent one of said sloping faces and connection region of each of said second sloping faces is formed into a blocking face the other face of said washer is provided with a plurality of equally arranged sharp engaging ribs, each of said ribs has an upright face and a third sloping face and sloping direction of said third sloping face is similar to sloping direction of said second sloping faces of said washer, connection region of each of said first sloping face is formed with a blocking face, two opposite sides of said washer are each formed with a notch, whereby said bolt shaft passes through said washer and two working pieces in sequence, and in turn, a second washer being placed in a reverse position is passed through, and said screw nut is used to secure the two working pieces, said blocking face of said bolt head and said blocking faces of said nut will urge said blocking face of said washers to drive said washers in rotation.

* * * * *